United States Patent [19]

Kato

[11] Patent Number: 5,893,231
[45] Date of Patent: *Apr. 13, 1999

[54] ARTIFICIAL BAIT

[75] Inventor: Seiji Kato, Saitama, Japan

[73] Assignee: Daiwa Seiko, Inc., Tokyo, Japan

[*] Notice: This patent is subject to a terminal disclaimer.

[21] Appl. No.: 08/886,137

[22] Filed: Jun. 30, 1997

Related U.S. Application Data

[63] Continuation of application No. 08/666,058, Jun. 19, 1996, Pat. No. 5,689,910, which is a continuation of application No. 08/231,478, Apr. 22, 1994, abandoned.

[30] Foreign Application Priority Data

Apr. 28, 1993 [JP] Japan ................. 5-125125

[51] Int. Cl.$^6$ ........................................ A01K 85/00
[52] U.S. Cl. ............................................... 43/42.24
[58] Field of Search ...................... 43/42.06, 42.36, 43/42.39, 42.33, 42.31, 42.24

[56] References Cited

U.S. PATENT DOCUMENTS

| | | | |
|---|---|---|---|
| 2,381,380 | 8/1945 | Carter | 18/53 |
| 2,503,672 | 4/1950 | Johnson et al. | 43/42.24 |
| 2,587,264 | 2/1952 | Wood | 43/42.33 |
| 2,613,471 | 10/1952 | Traycik | 43/42.31 |
| 3,011,950 | 12/1961 | Mehaffey | 167/85 |
| 3,271,486 | 9/1966 | Dunlop | 264/45 |
| 4,074,455 | 2/1978 | Williams, Jr. | 43/42.06 |
| 4,197,667 | 4/1980 | Helfenstine | 43/42.06 |
| 4,214,397 | 7/1980 | Kent | 43/42.28 |
| 4,827,655 | 5/1989 | Reed | 43/17.5 |
| 4,862,631 | 9/1989 | Wilson et al. | 43/42.33 |
| 4,998,372 | 3/1991 | Reed | 43/42.24 |
| 5,007,193 | 4/1991 | Goodley et al. | 43/42.28 |
| 5,044,110 | 9/1991 | Henderson et al. | 43/42.33 |
| 5,170,580 | 12/1992 | Rosenblatt | 43/42.06 |
| 5,276,993 | 1/1994 | Rosenblatt | 43/42.06 |
| 5,299,378 | 4/1994 | Ballard | 43/42.06 |
| 5,333,405 | 8/1994 | Bowles | 43/42.06 |

FOREIGN PATENT DOCUMENTS

| | | |
|---|---|---|
| 00028710 | 5/1981 | European Pat. Off. |
| 36-9185 | 1/1961 | Japan |
| 56-21231 | 5/1981 | Japan |
| 65-46377 | 10/1981 | Japan |

*Primary Examiner*—Joseph J. Hail, III
*Assistant Examiner*—Anthony Ojini
*Attorney, Agent, or Firm*—Longacre & White

[57] ABSTRACT

An artificial bait which can provide a great effect to attract fish by means of light emission or reflection from air bubbles contained in the artificial bait. A large number of air bubbles are enclosed within a artificial bait main body formed of elastic material having flexibility and light transmissible property wherein the air bubbles may be deformed to enhance the attractiveness of the bait.

10 Claims, 3 Drawing Sheets

ARTIFICIAL BAIT

This is a continuation of application Ser. No. 08/666,058, filed Jun. 19, 1996 now U.S. Pat. No. 5,689,910, which is a File Wrapper Continuation of Ser. No. 08/231,478 filed Apr. 22, 1994 now abandoned.

BACKGROUND OF THE INVENTION

1. Field of the Invention

The present invention relates to an artificial bait which is also called a lure and, in particular, to an artificial bait called a soft lure which can be expanded or contracted like rubber.

The artificial bait is able to attract fish by use of the fact that it resembles a genuine bait or edible creature and, in many cases, the artificial bait uses the phenomenon that fish is interested in the movement, brightness, color and the like of the artificial bait.

2. Description of Related Art

Japanese Utility Model Examined Publication No. Sho. 56-21231 discloses an artificial bait which comprises a core material formed of a transparent hard synthetic resin mixed With air bubbles and a transparent soft synthetic resin pipe covering the peripheries of the core material. This conventional artificial bait is developed to enhance the light emitting effect of the air bubbles in the water.

Also, in Japanese Utility Model Examined Publication No. Sho. 56-46377, the artificial bait disclosed in the above publication is bendably connected in the middle portion in the longitudinal direction thereof by a connecting ring, go that the artificial bait can be turn and twisted in the water.

Further, in the U.S. Pat. No. 4,197,667, there is disclosed an artificial bait which includes a large number of recessed portions or pockets in the peripheries thereof and is formed of an elastic member having an elastic property. According to this artificial bait, air within the recessed portions is released into the water to thereby attract fish.

However, in each of the artificial baits respectively disclosed in the first and second utility model publications, because the core member with air bubbles mixed therein is formed of a hard synthetic resin, the shape of each air bubble mixed in the core member is fixed (not changed) and thus lacks variety. That is, the two artificial baits fail to have a sufficient effect in attracting fish. Also, in the artificial bait according to the aforementioned U.S. patent, since the air within the recessed portions is released into the water from the recessed portions, air bubbles cannot be left within the artificial bait in such a manner that the air bubbles are mixed therein, and thus there can be scarcely provided an effect to attract fish by means of the lights of the air bubbles.

SUMMARY OF THE INVENTION

In view of the above, it is an object of the invention to provide an artificial bait which can provide a great effect to attract fish by means of light emission or reflection from air bubbles contained in the artificial bait.

In order to attain the above-noted and other objectives, the present invention provides an artificial bait having a main body formed of elastic material having flexibility and light transmissive property, wherein the main body contains a large number of air bubbles embedded therein.

The artificial bait formed of an elastic material having flexibility and a light transmissive property can be easily expanded or contracted when it abuts against a rock or the like in the bottom of a river, so that the air bubbles contained within the artificial bait are deformed in shape. The deformed air bubbles vary the lights that are emitted from the air bubbles through the material having a light transmissive property, which enhances the fish luring or attracting effect of the artificial bait.

The artificial bait is preferably formed of gelatin or biodecomposition plastic so that the artificial bait, even if mistakenly left in a fishing place, is decomposed with the air of microbe under the natural environment. Further, after the initial biodecomposition, the air bubbles contained in the artificial bait are exposed to or communicated with the outside to increase surface area of the artificial bait, to thereby increase the speed of biodecomposition.

In the case that an outer layer is provided, the outer layer can surely protect the artificial bait and the air bubbles embedded therein.

The present invention further provides a process of forming an artificial bait, comprising the steps of: (1) providing an elastic material substantially in the form of paste, wherein the elastic material exhibits flexibility and light transmissible property after being solidified; (2) positively mixing air bubbles into the elastic material in the form of paste; (3) forming from the elastic material a paste lump of a predetermined shape with air bubbles embedded therein; and (4) solidifying the past lump.

In this process, since a large number of air bubbles can be easily mixed into a paste-like unformed or raw material, the air bubbles can be mixed sufficiently into a lump of paste having a given shape so that the artificial bait can be easily produced.

Preferably, the outer periphery of the paste lump is covered with a second elastic material for protection. More specifically, it is preferable that the outer layer of the artificial bait is formed by covering the outer peripheries of the paste lump with a paste-like unformed material of a similar or identical property with no air bubbles mixed therein. In this case, the air bubbles attached to the surfaces of the paste lump are crushed to thereby cover recessed portions, the recessed portions can be made to form air bubbles and also the surface of the artificial bait is protected so that the air bubbles in the neighborhood of the surface of the artificial bait are hard to destroy.

DETAILED DESCRIPTION OF THE PREFERRED EMBODIMENTS

Description will be given in detail of the invention with reference to an embodiment thereof shown in the accompanying drawings.

Figure 1:
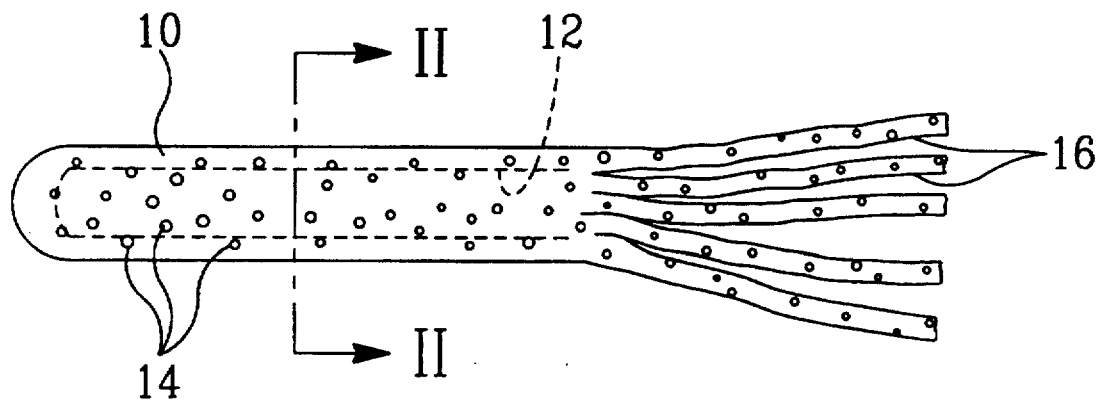
FIG. 1 is a side view of an artificial bait according to the invention.
Figure 2:
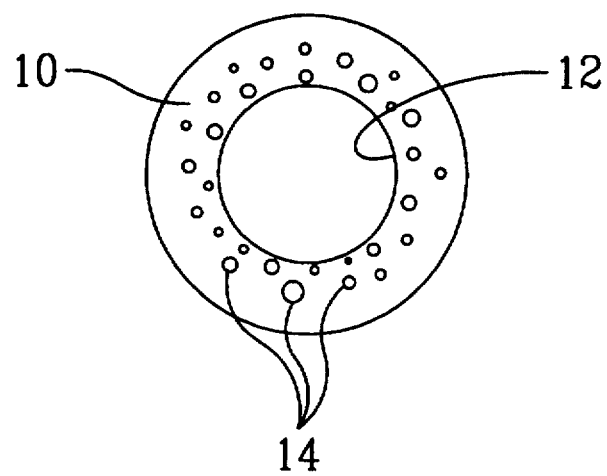
FIG. 2 is a transverse section view taken along the arrow line II—II shown in FIG. 1.

FIG. 1 is a side view of an artificial bait according to the invention. FIG. 2 is a transverse section view taken along the section line II—II of FIG. 1. With reference to these figures, a large number of air bubbles are sealed at discrete positions into an artificial bait main body 10 which is flexible, can be expanded or contracted elastically like rubber and has a light transmissive property. The artificial bait main body 10 includes therein a cavity portion 12 to thereby enhance the flexibility thereof. Also, the artificial bait 10 includes a plurality of skirt portions 16 in the rear portion thereof, so that the artificial bait can swim stably and easily in the water.

The above-mentioned artificial bait main body 10 is formed by use of plastic such as vinyl chloride resin, or by use of a gel-like material formed of natural rubber, synthetic rubber, gelatin or the like. In the case of using a non-natural material, the artificial bait main body 10 is preferably made, in view of environmental protection, from biodegradation or biodecomposition plastic such as polyvinyl alcohol, aliphatic polyester, poly lactic acid, starch or the like, or the mixture of starch and polyvinyl alcohol or the like. With the aid of microbe such as bacteria, mold or the like, the biodegradation or biodecomposition plastic is decomposed, under the natural environment, into low molecular weight compound such as water, carbonic acid gas or the like which does not adversely affect the natural environment.

In the artificial bait main body 10, no air bubble is present in the outer peripheral portion thereof but air bubbles 14 are surely sealed in the artificial bait main body 10.

Next, description will be given below of a method of manufacturing the artificial bait shown in FIG. 1 with reference to FIGS. 3 and 4. At first, vinyl chloride resin with a plasticizer added thereto is heated as required into a paste-like material which is then put into a container 20; and, a stirrer 22 is used to stir the interiors of the container 20 so that air bubbles 14 are mixed into the interiors of the container 20. During this operation, a dye, a pigment and other mixtures may be mixed into the container 20 as required. If a core metal 24 is immersed in the paste-like unformed material 10A' in this state and the core metal 24 is then pulled up, then the unformed material 10A' having a shape corresponding to the core metal 24 is attached to the peripheral portions of the core metal 24 to thereby form a paste lump 10A. And, a large number of air bubbles 14 are sealed in the paste lump 10A.

The paste lump 10A may be solidified to thereby form an artificial bait. However, in this case, the air bubbles attached to the surface of the artificial bait are crushed to provide recessed portions. In order not to expose such recessed portions to the surface of the artificial bait, there is developed a following manufacturing method. Also, the method of mixing the air bubbles 14 into the unformed material 10A' within the container 20 is not limited to the above-mentioned method but, for example, the air bubbles 14 can also be mixed by using such a mechanism as supplies oxygen to a water tank for tropical fishes.

Figure 3:
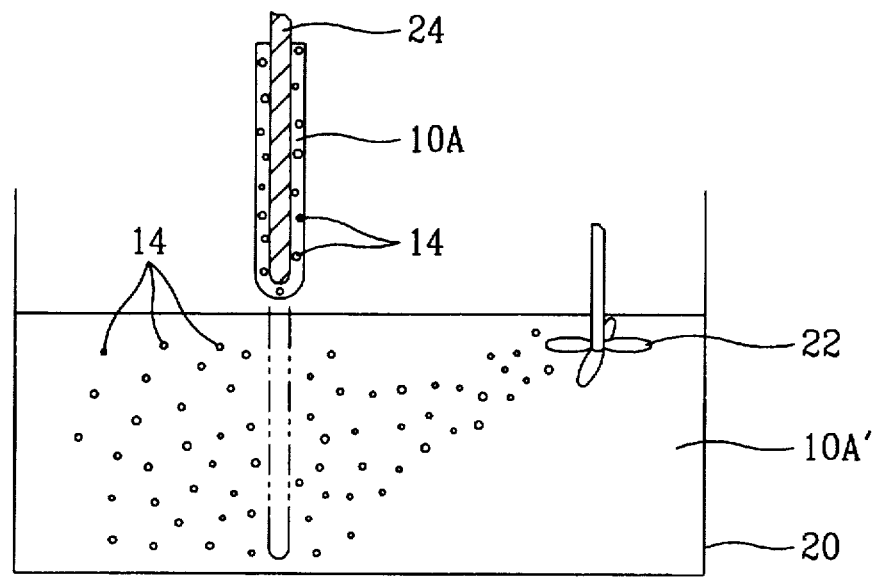
FIG. 3 is an explanatory view of a method of manufacturing an artificial bait according to the invention.
Figure 4:
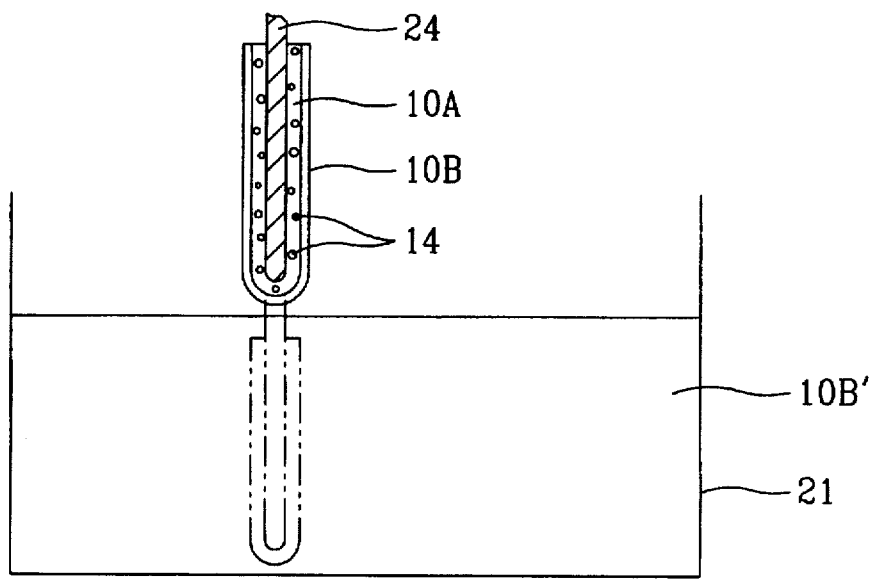
FIG. 4 is an explanatory view of part of an artificial bait manufacturing method according to the invention; and, FIG. 5 is an explanatory view of the operation and effects provided by the artificial bait shown in FIG. 1.

In other words, if the paste lump 10A attached to the core metal 24 is immersed, before it is solidified, into the paste-like unformed material 10A' shown in FIG. 3 before the air bubbles are mixed therein, or into a paste-like unformed material 10B' such as natural rubber, synthetic rubber, gelatin or the like which has been previously prepared in another container 21, and then the immersed lump 10A is pulled up, then there is formed an outer layer 10B in such a manner that the outer layer 10B is attached to the paste lump 10A serving as an inner layer. The inner layer 10A and outer layer 10B are integrally cooled and solidified to thereby enhance the reliability of the unified inner and outer layer.

In this case, if the inner and outer layers are formed of the same material, then no boundary is present in the transverse section of the artificial bait and the peripheral portions of the inner layer in which the air bubbles are present are covered with the corresponding portions of the outer layer as shown in FIG. 2. On the other hand, if the two layers are formed of different materials, then it is true a boundary is present between the inner and outer layers but a similar effect can be obtained. That is, only in the inner layer 10A, the air bubbles attached to the surface thereof are crushed to form recessed portions. However, these recessed portions can be covered so as to form air bubbles, so that a large number of air bubbles 14 can be surely sealed in the artificial bait and also the surface of the artificial bait can be protected similarly.

Figure 5:
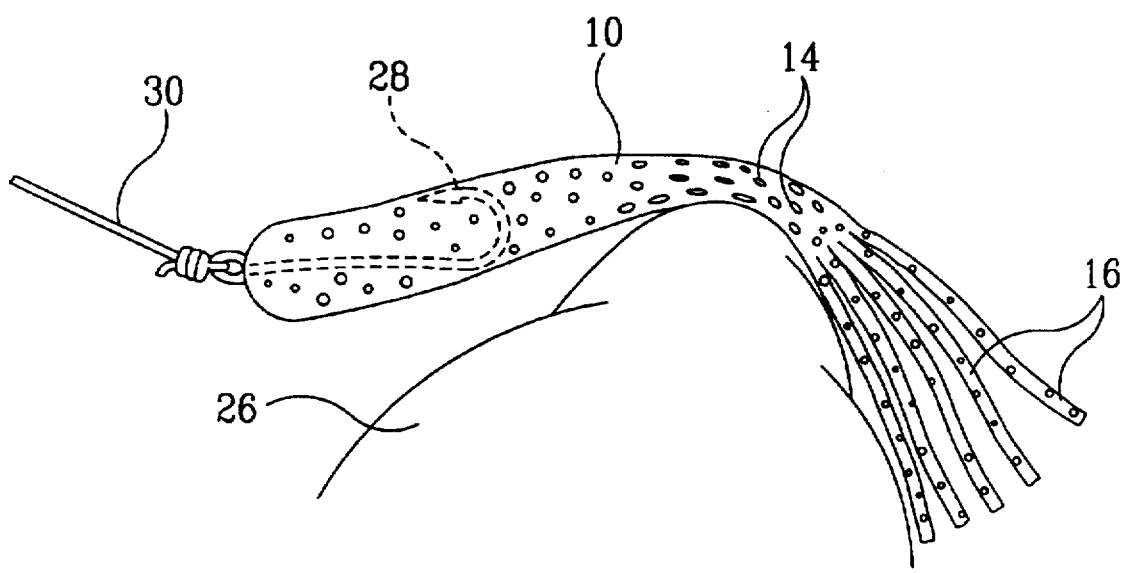

Next, the core metal 24 is removed from the unified and solidified inner and outer layers to thereby provide a cavity portion 12 and the rear portion of the unified inner and outer layers is cut to provide skirt portions 16, thereby completing an artificial bait. If a hook 28 is inserted into the leading portion of the thus completed artificial bait and a fishing line 30 is pulled to thereby allow the artificial bait to swim in the water, then the artificial bait can be hitched on the rock 26 or the like in the water. In this case, the artificial bait according to the invention, which is freely expandable and contractible like rubber, is extended in such a manner as shown in FIG. 5 and thus the air bubbles 14 contained in the artificial bait are also deformed in a long and narrow state. Due to this, the lights of the air bubbles 14, which can be watched by fish through the artificial bait main body 10 formed of a light transmissive material, can be varied in various ways to thereby be able to lure the fish.

While the foregoing invention has been particularly shown and described with reference to a preferred embodiment, it will be understood by those having ordinary skill in the art that various changes in form and detail may be made therein without departing from the spirit and scope of the invention. In the illustrated embodiment, the artificial bait main body 10 is formed by use of the above-mentioned core metal 24. However, this is not limitative but other methods are also available. For example, the artificial bait main body can be formed by pouring a paste-like unformed material into a metal mold.

What is claimed is:

1. An artificial bait having a main body formed of a solid elastic material having flexibility and light transmissive properties, wherein said main body contains a plurality of discretely positioned air bubbles embedded therein, and wherein each of said plurality of discretely positioned air bubbles is fixed in position relative to said main body.

2. The artificial bait according to claim 1, wherein said air bubbles are visible from an outside of said main body.

3. The artificial bait according to claim 1, wherein each of said air bubbles is completely enclosed by said main body.

4. The artificial bait according to claim 1, wherein each of said air bubbles are deformable in accordance with an expansion and contracting of said main body.

5. The artificial bait according to claim 1, wherein said elastic material forming said main body includes gelatin.

6. The artificial bait according to claim 1, wherein said elastic material forming said main body includes biodecomposition plastic.

7. The artificial bait according to claim 1, wherein said main body includes inner and outer layers, said outer layer surrounding said inner layer.

8. The artificial bait according to claim 7, wherein said air bubbles are exclusively contained in said inner layer.

9. The artificial bait according to claim 7, wherein said inner and outer layers are integrated with each other.

10. The artificial bait according to claim 7, wherein said inner and outer layers are formed by the same material.

* * * * *